United States Patent Office 2,791,167
Patented May 7, 1957

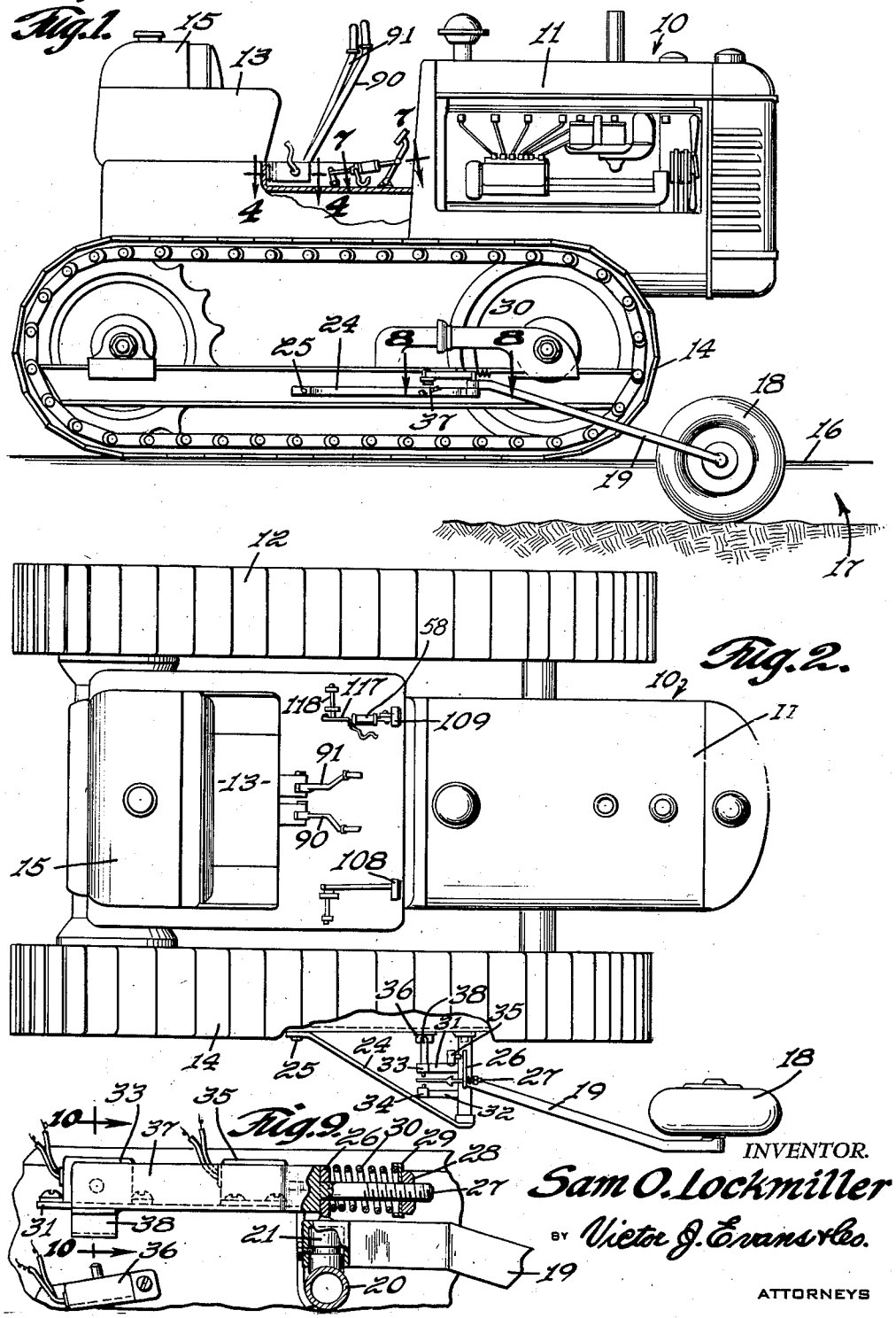
May 7, 1957 — S. O. LOCKMILLER — 2,791,167
AUTOMATIC STEERING MECHANISM
Filed Feb. 3, 1955 — 2 Sheets-Sheet 1
INVENTOR.
Sam O. Lockmiller
BY Victor J. Evans & Co.
ATTORNEYS May 7, 1957 S. O. LOCKMILLER 2,791,167
AUTOMATIC STEERING MECHANISM
Filed Feb. 3, 1955 2 Sheets-Sheet 2
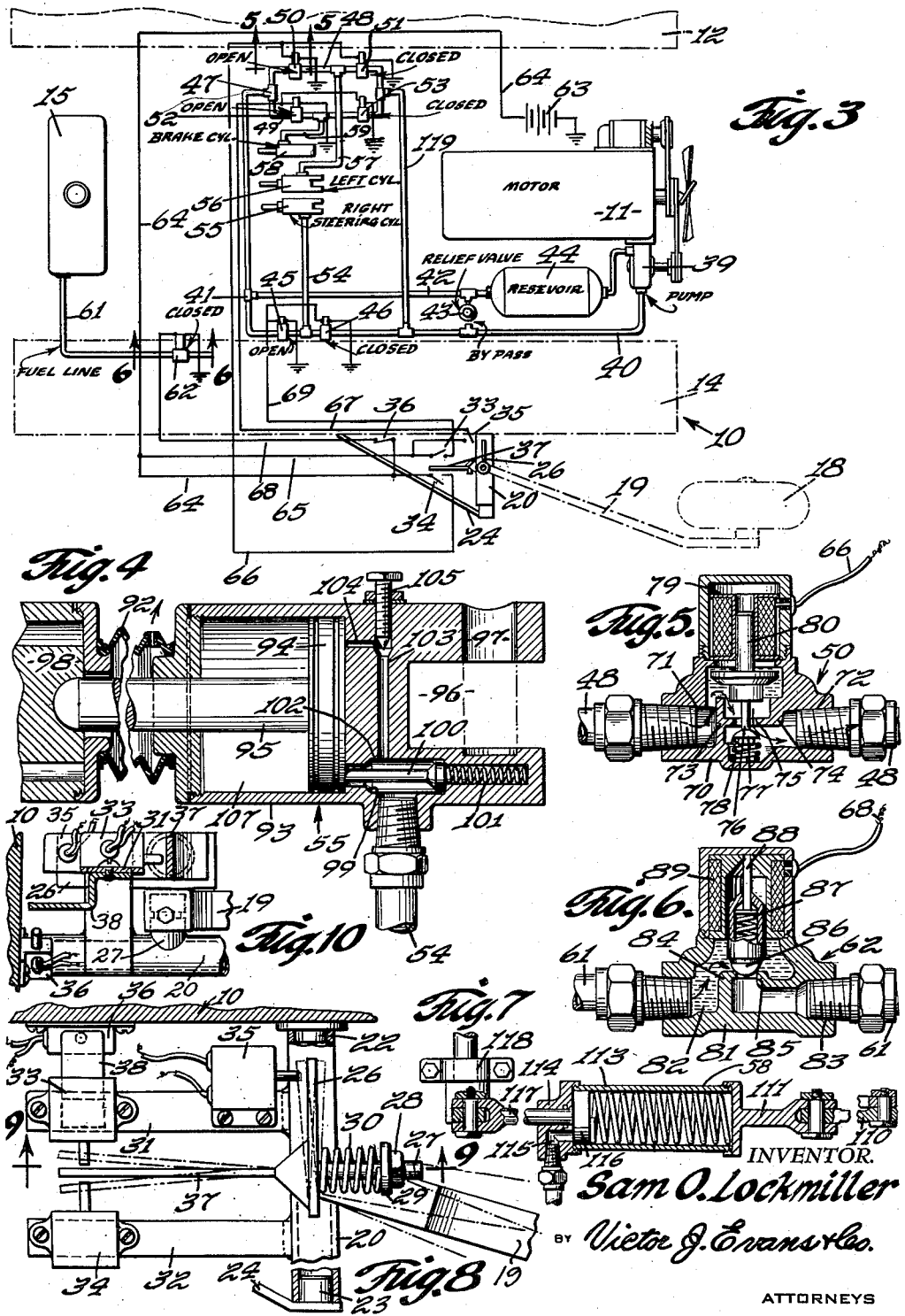
INVENTOR.
Sam O. Lockmiller
BY Victor J. Evans & Co.
ATTORNEYS

2,791,167

AUTOMATIC STEERING MECHANISM

Sam O. Lockmiller, Grier, N. Mex.

Application February 3, 1955, Serial No. 486,003

3 Claims. (Cl. 97—47.02)

This invention relates to a vehicle such as a tractor, and more particularly to an automatic steering mechanism for such a vehcile.

This invention is a continuation in part of the automatic tractor driver shown and described in my copending application, Ser. No. 394,754 now abandoned.

The object of the invention is to provide an automatic steering mechanism for a vehicle such as a tractor whereby the tractor will move along a field in a pre-determined path without the necessity of having a driver or person in the vehicle.

Another object of the invention is to provide a mechanism for causing a tractor to automatically follow the pre-determined path of a furrow such as a furrow made by a moldboard or disc breaking plow whereby the tractor will be steered automatically to the furrow and around corners.

A further object of the invention is to provide an automatic steering mechanism for a tractor which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the tractor equipped with the automatic steering mechanism of the present invention, and with parts broken away and in section.

Figure 2 is a top plan view of the tractor, and with parts broken away and in section.

Figure 3 is a schematic illustration of the wiring and hydraulic piping system for the automatic steering mechanism of the present invention.

Figure 4 is a sectional view taken on the line 4—4 of Figure 1.

Figure 5 is a sectional view taken on the line 5—5 of Figure 3 and illustrating one of the normally open solenoid controlled valves.

Figure 6 is a sectional view taken on the line 6—6 of Figure 3 and illustrating one of the normally closed valves.

Figure 7 is a sectional view taken on the line 7—7 of Figure 1.

Figure 8 is a sectional view taken on the line 8—8 of Figure 1.

Figure 9 is a sectional view taken on the line 9—9 of Figure 8.

Figure 10 is a sectional view taken on the line 10—10 of Figure 9.

Referring in detail to the drawing, the numeral 10 designates a tractor of the Caterpillar type which includes an engine 11, a driver's seat 13, and endless tracks or treads 12 and 14, Figures 1 and 2. A fuel holding tank 15 may be arranged rearwardly of the seat 13, and the present invention is directed to a steering mechanism whereby the tractor will follow a pre-determined path without the necessity of a driver actually sitting in the tractor. Specifically the tractor is designed to be used so that it will follow a furrow such as the furrow 17, Figure 1, the normal ground line being indicated by the numeral 16 in Figure 1.

The steering mechanism includes a furrow wheel 18 which is adapted to travel in the furrow 17, and the wheel 18 is rotatably mounted on the front end of an arm 19. The arm 19 has its rear end pivotally secured to an upstanding portion 21 which projects upwardly from a rotary or pivotally mounted tube 20, Figures 8 and 9. One end of the tube 20 engages a bushing 22 which may be secured to the tractor 10, while the other end of the tube 20 rotatably engages a bushing 23 which is secured to the front end of a brace 24, the rear end of the brace 24 being secured to the tractor in any suitable manner, as for example by means of a securing element 25, Figure 2. Arranged above the tube 20 is a movable finger 26 which has a bolt 27 extending therethrough, and a nut 28 is arranged in engagement with the bolt 27 and abuts a washer 29, there being a coil spring 30 interposed between the finger 26 and the washer 29. The coil spring 30 serves to maintain the parts in their normal position and return the parts to their normal position when pressure thereon is released. Arranged rearwardly of the tube 20 is a pair of spaced parallel bars 31 and 32 which have switches 33 and 34 secured thereto. A switch 35 is also secured to the bar 31 adjacent its front end, and a switch 36 is secured to the body of the tractor in any suitable manner. The finger 26 is mounted for movement into and out of engagement with a movable finger or core which projects forwardly from the switch 35, and there is provided a lever 37 which extends rearwardly from the finger 26, the lever 37 being mounted for movement into and out of engagement with the switches 33 and 34 for actuating the switches as the wheel 18 pivots or moves. A lug 38 may be secured to the bottom of the bar 31 in any suitable manner, and the lug 38 is mounted for movement into and out of engagement with the switch 36 for actuating this switch. The bolt 27 is a continuation of the lever or finger 37, and the spring 30, nut 28 and washer 29 serve to connect the parts and yet permit an angular relative movement. The finger 26 is rigid with the arm 19. The bars 31 and 32 are arranged directly to the rear of the finger 26 and are secured to the tube 20.

Referring to Figure 3 there is shown the wiring and piping arrangement for the automatic steering mechanism of the present invention wherein the numeral 39 designates a pump which is driven by the motor or engine 11, and extending from the pump 39 is a first conduit 40 which is adapted to have hydraulic fluid pass therethrough from the pump 39. A fitting 41 connects a second conduit 42 to the conduit 40, and the conduit 42 leads back to the reservoir tank 44 which is adapted to hold a quantity of hydraulic fluid therein, there being a conduit 119 connected to the conduit 40. A bypass line having a relief valve 43 therein interconnects the first conduit 40 and second conduit 42. Arranged in the first conduit 40 is a normally open valve 45 and there is also arranged in this conduit a normally closed valve 46. A T-fitting 47 is connected to an end of the conduit 40, and a third conduit 48 and a fourth conduit 49 are connected to the fitting 47. Arranged in the third conduit 48 is a normally open valve 50 and a normally closed valve 51. Arranged in the fourth conduit 49 is a normally open valve 52 and a normally closed valve 53. A branch conduit 54 leads from the first conduit 40 to a right steering cylinder 55. A left steering cylinder 56 is connected to the third conduit 48 by means of a branch line 57. A brake cylinder 58 is connected to the conduit 49 by means of a branch line 59. The numeral 15 designates a fuel holding tank which can hold a suitable quantity of liquid fuel for operating the motor 11, and a line 61 leads from the tank 15, there being a normally closed solenoid operated valve 62 in the line 61.

The numeral 63 designates a source of electrical energy which may be a battery on the tractor, and a wire 64 leads from the battery 63 to the electric switch 34. A branch wire 65 leads from the wire 64 to the switch 33. A wire 66 leads from the switch 34 to the pair of valves 50 and 51, there being a wire 67 leading from the switch 35 to the pair of valves 52 and 53. All of the valves are of course grounded as shown in Figure 3. The valve 62 is connected to the switch 36 by means of a wire 68. The switches 35 and 36 are connected to the battery by leads 65 and 64. An electric wire 69 leads from the valves 45 and 46 to the electric switch 33.

Referring to Figure 5 there is shown in detail one of the normally open valves such as the valve 50. It being understood that all of the various normal open valves may have the same construction as the valve 50 shown in Figure 5. The valve 50 includes a housing 70 which is provided with an inlet port 71 and an outlet port 72, there being a baffle 73 arranged within the housing 70. A wall 74 is provided with an opening 75, and a stem 76 reciprocably projects through the opening 75 in the wall 74. The stem 76 is provided with a head 77 on its lower end which is mounted for movement into and out of closing relation with respect to the opening 75, and a coil spring 78 is arranged in engagement with the head 77. A core 80 is secured to the upper end of the stem 76, and a solenoid 79 surrounds the core 80, so that when movement of the stem 76 and head 77 is to be effected, it is only necessary to control the electric current to the solenoid 79.

Referring to Figure 6 of the drawings there is shown one of the normally closed valves such as the valve 62, all of the various normally closed valves having the same construction so that a description of one will suffice for all. Thus, the valve 62 includes a housing 81 which has inlet and outlet ports 82 and 83, there being a baffle 84 in the housing. There is further provided a valve seat 85 and a head 86 is mounted for movement into and out of closing relation with respect to the valve seat 85, the head 86 being arranged at the lower end of the stem 88 which has a spring 87 arranged in engagement therewith. A solenoid 89 is provided for causing up and down movement of the head 86 as the circuit to the solenoid 89 is opened or closed.

There is further provided a pair of manually operable clutch levers 90 and 91, Figures 1 and 2. The lower end of the clutch lever 90 may be pivotally connected to the right steering cylinder 55, while the other lever 91 can be pivotally connected to the cylinder 56. One of these cylinders is shown in detail in Figure 4 such as for example the cylinder 55 which includes a housing 93 that has a piston 94 reciprocably arranged therein, there being a rod 95 connected to the piston 94. The rod 95 extends through a dust jacket 92 which may have a vent therein. The housing 93 is provided with a bifurcated portion 96 which may receive the lower end of one of the clutch levers, there being an opening 97 whereby a suitable pivot pin can connect the housing 93 to the bottom of the clutch lever. The rod 95 may be connected to a steering clutch operating member 98. Arranged in the housing 93 is a chamber 99 which can be connected to the hydraulic supply line 54. A stem 100 is slidably mounted in the chamber 99 and abuts the piston 94, there being a spring 101 arranged in engagement with the head of the stem, the head of the stem being mounted for movement into and out of closing relation with respect to a valve seat 102 which communicates with the space 107 in which the piston 94 moves. A passageway 103 leads from the chamber 99, and there is further provided a bore or passageway 104 which connects the passageway 103 with the space 107, there being a manually operable valve 105 for controlling the flow of fluid through the passageways 103 and 104.

There is further provided foot pedals 108 and 109, and the pedal 109 may be connected to a link 110 which is pivotally secured to a forwardly extending bracket 111, Figure 7. The bracket 111 may be secured to an end of a cylinder 58 which has a coil spring 113 therein. A cap 114 is connected to the cylinder 112, there being a passageway 115 in the cap 114, and movably mounted in the cylinder 112 is a piston 116. A rod 117 is connected to the piston 116, and the rod 117 leads to a brake actuating mechanism 118.

From the foregoing it is apparent that there has been provided an automatic tractor driver which will drive a tractor such as the tractor 10 automatically in alignment with a furrow such as the furrow 17 which may be made by a moldboard or disc breaking plow. The line 40 is the pressure line from the hydraulic pump 39 and the line 42 is the return line for the reservoir 44. The valves are solenoid actuated and as stated previously, the valve 50 is normally open, while the valve 51 is normally closed, and the valve 52 is normally open, while the valve 53 is normally closed. 45 is a normally open valve, while 46 is a normally closed valve and 62 is normally closed. Switches 34, 33 and 35 are also normally open and these switches are operated by the furrow wheel 18. Switch 36 is a normally closed safety switch which controls the valve 62 in the fuel line 61. The finger 26 operates the switch 35 and the spring 30 serves to center the parts. The term "normally," as used above refers to the position of the valve when no electric current is flowing. Thus, for example, the "normally closed" valve 62 is actually usually open since the switch 36 is normally closed. Thus, the arrangement shown in Figure 8 provides a universal joint or connection whereby the finger 26 can pivot in a horizontal plane to actuate the switch 35, while the lever 37 can pivot to operate the switches 33 and 34, and the lug 38 can move vertically to actuate the switch 36. The brake operating cylinder 58 shown in detail in Figure 7 replaces the regular brake operating linkage and serves to operate the braking mechanism, the spring 113 having sufficient tension to insure that fluid will not enter the cylinder 112 from the passage 115 until the steering cylinder or rod 95 has started turning the tractor.

In Figure 4 there is shown the steering operating cylinder which is a two speed hydraulic cylinder. The fast speed causes the piston 94 to be pushed back far enough to start the tractor turning slowly, and then the valve 100 closes the seat 102 to cause the fluid to pass through the restricted passages 103 and 104 to let the piston 94 move out very slowly. This insures that the tractor will not have a jerking movement during the steering thereof. The piston 94 is returned by the back pressure of the steering mechanism and the spring 101 maintains the proper tension on the valve 100.

The mechanism of the present invention will cause the tractor to be driven automatically around the field which is being plowed with a disc or moldboard plow and the tractor will go around the field with a spiral-like motion. The tractor tracks 12 and 14 travel on unplowed ground to the left of the furrow 17 while the guide wheel 18 travels in the furrow 17 and the wheel 18 is turned slightly so that it will pull against the bank of the furrow.

The steering of the tractor is accomplished as follows. The tractor is steered by hand by means of the levers 90 and 91 and the foot brakes 108 and 109 are used to make the tractor turn shorter. The levers 90 and 91 are connected to the clutches, there being one of the clutches for each track. By pulling back on the lever 90 the clutch will release the power from the right track to leave the left track do the pulling and this will cause the tractor to turn to the right. This is not a short turn unless the foot pedal 108 is pressed on. When the pedal 108 is depressed it applies a brake to the right track 14 which serves to lock the same if enough pressure is applied. By pulling back on the lever 91 the left clutch which drives the truck 12 is released and a turn in the left direction is started, but to make the turn shorter the foot pedal 109 is depressed to further slow the track 12 or lock it as desired. In pulling the levers 90 and 91 there may be some free play before the clutches start to release. This action is usually done quick enough until the clutches start to release and then they are moved slowly to keep the steering from being jerky. Thus it will be seen that the brakes 108 and 109 are necessary only on corners. Certain makes of crawler tractors are steered by brakes on each track and they have a differential gear and whereby the brakes are used to slow or stop the respective tracks. In such a case there are no floor pedals and the tracks can be steered without the cylinder 58.

When steering by the automatic mechanism of the present invention, the first round is made by hand steering with the guide wheel 18 and arm 19 removed by means of the connection at 21. This is all that is required to drive it by hand. Now, with the guide wheel 18 and arm 19 back in place and the wheel 18 in the furrow, the parts are ready for automatic driving. Thus, if the wheel 10 gets too close to the track 14 the switch 34 will be closed to thereby feed current to the valves 50 and 51. It is to be noted that the portion of the conduit between the pump 39 and the valve 46, as well as the conduit 119, are under hydraulic pressure at all times. The relief valve 43 regulates this pressure when the valves 51, 53 and 46 are closed and the fluid has no place to go except through the relief valve 43 back to the reservoir 44. Current flowing when switch 34 is closed opens the valve 51 and closes the valve 50 to apply pressure to the cylinder 56 through the flexible hose 57. The piston 94 will move back quickly until the valve 100 closes and this will start the tractor turning and fluid will then continue to pass through the restrictor valve 105 moving the piston 94 back slowly until the switch 34 opens.

As the tractor turns left moving away from the wheel 18, the switch 34 is opened which breaks the current to the valves 51 and 50. This closes the valve 51 and opens valve 50. The back pressure on the steering mechanism 98 forces the fluid out of the cylinder 56 through the flexible line 57, then through the valve 50, then through the line 40 and back to the reservoir 44 through the line 42. This completes a left turn cycle unless a corner is being turned. On a corner the same switch 34 is closed and the fluid action is the same except while the switch 34 is closed the track 14 keeps moving closer to the furrow 17 to thereby move the finger 26 against the switch 35 to thus close switch 35 and send current to the valves 52 and 53. This closes the valve 52 and opens the valve 53 whereby fluid is sent to the cylinder 58 through the flexible line 59. This causes movement of the piston 116 forward to apply the left brake to make the tractor turn shorter and pull back the track 14 away from the wheel 18. This opens the switch 35 which breaks the current to the valves 52 and 53 and closes the valve 53 and opens the valve 52.

Fluid is then forced out of the cylinder 58 through the line 59 and valve 52 into the line 40 to the line 42 and into the reservoir 44. If more brake is necessary, the switch 35 will close again and the same fluid procedure will be repeated for the brake. As the tractor completes the corner, the track 14 moves still further away from the wheel 18 and the finger 37 will release the switch 34 to break the current to the valves 50 and 51. This releases fluid as previously explained for the cylinder 56.

If the tractor moves away from the furrow, the wheel 18 moves away from the track 14 to close the switch 33 which sends current to the valves 45 and 46 closing the valve 45 and opening the valve 46. This sends fluid pressure into the cylinder 55 through the valve 46, flexible line 54 and into the cylinder 55. The cylinder 55 will fill and move the piston 94 quickly back until the valve 100 seats and then the tractor starts turning but the piston 94 continues to move slowly back filling through the restrictor valve 105 and passages 103 and 104. This continues until the tractor moves the track 14 closer to the wheel 18 and the finger 37 releases the switch 33 which breaks the current to the valves 45 and 46. This opens the valve 45 and closes the valve 46 which empties the cylinder 55 back to the reservoir 44 through the chamber 99. It is to be noted that the spring 101 is a light spring so that the fluid pressure will open the valve or compress the spring when the fluid is returning to the reservoir. The fluid from the chamber 99 passes through the line 54 and valve 45 and then through the line 42 back to the reservoir 44.

As previously stated the portion of the conduit 40 between the pump 39 and the valve 46 as well as the conduit 119 are under pressure at all times, the pressure being regulated and released by means of the relief valve 43. The line 42 is a return line only. Also, that portion of the conduit 40 between the valve 45 and the fitting 47 is also only a return line. Furthermore, the portion of the conduit 48 between the fitting 47 and the connection with the line 57 is a return line. The portion of the conduit 49 between the fitting 47 and the line 59 is also a return line.

The conduits 59, 54 and 57 serve both as inlet and return lines and these lines 59, 57 and 54 are flexible since the cylinders must move when the device or tractor is being steered by hand. The normally open valves 50, 52 and 45 are open to return from their respective cylinders to the reservoir when there is no current applied to the solenoids.

The finger 37 closes the switch 34 before the finger 26 closes the switch 35. This makes the steering cylinder 56 operate before the brake cylinder 58 applies the brake. The member 98 shown in Figure 4 is the connecting link which is an original part of the tractor, and leads from the steering lever and cylinder to the track release clutch. The mechanism 118 shown in Figure 7 is connected to the brake inside the tractor and is a linkage mechanism for operating the same. The operating levers 90 and 91 are used when steering by hand and in using the levers 90 and 91, the levers are pulled back to move the cylinder of Figure 4 as a complete unit back to compress the dust protector 92. At the same time the piston rod 95 pushes back the steering linkage 98 which is connected to the steering clutches. The switch 36 is normally closed and is arranged so that when the furrow wheel 18 gets out of the furrow 17 and on the same level as the tractor, the switch 36 will break the circuit to the normally closed solenoid valve 62 which is located in the fuel line 61 of the tractor. Thus, the fuel will be shut off whereby there is provided a safety mechanism which will stop the tractor in the event that wheel 18 should get out of the furrow.

I claim:

1. In a tractor, a body, a pair of spaced parallel endless tracks, movably connected to said body, a furrow wheel arranged adjacent one side of the tractor, an arm connected to said wheel, a tube pivotally connected to said body and having an upstanding portion pivotally secured to the rear end of said arm, a finger arranged above said tube and secured to said arm, a first and second bar arranged rearwardly of said finger and secured to said tube, a first switch mounted on the rear end of one of said bars, a second switch mounted on the other of said bars, a lever extending rearwardly from said finger and mounted for movement into and out of engagement with said switches, a bolt extending forwardly from said lever and a coil spring circumposed on said bolt whereby said lever is movably connected to said finger, a third switch mounted on one of said bars for engagement with said finger, a fourth switch secured to said body, a fuel holding tank having a fuel line leading therefrom, a valve in said last named line connected to said fourth switch, a lug carried by said lever for actuating said fourth switch, a hydraulic fluid holding reservoir mounted on said tractor, a pump for circulating the hydraulic fluid, a first conduit connected to said pump and having a first normally open valve therein and a second normally closed valve therein electrically connected to said first switch, a second conduit leading from said first conduit back to said reservoir, a T-fitting connected to said first conduit, third and fourth conduits connected to said T-fitting, normally open and normally closed valves in each of said third and fourth conduits, the valves in said third conduit being connected to said second switch, the valves in said fourth conduit being connected to said third switch, a brake cylinder having a branch line connected to said fourth conduit, a right steering cylinder having a branch line connected to said first conduit, and a left steering cylinder having a branch line connected to said third conduit.

2. The structure as defined in claim 1, and further including a bypass connection extending between said first and second conduits and having a relief valve therein.

3. The structure as defined in claim 1, wherein said steering cylinders are of the two speed type.

References Cited in the file of this patent

UNITED STATES PATENTS

| | | |
|---|---|---|
| 1,228,377 | Turnbull | May 29, 1917 |
| 2,254,083 | Nickles et al. | Aug. 26, 1941 |
| 2,424,288 | Severy | July 22, 1947 |
| 2,496,727 | Jenkins | Feb. 7, 1950 |